United States Patent [19]

Michalski et al.

[11] Patent Number: 4,764,681

[45] Date of Patent: Aug. 16, 1988

[54] METHOD OF AND APPARATUS FOR ELECTROOPTICAL INSPECTION OF ARTICLES

[75] Inventors: Thomas F. Michalski, Maumee, Ohio; David J. Bauer, Southfield, Mich.

[73] Assignee: Owens-Illinois Televison Products Inc., Toledo, Ohio

[21] Appl. No.: 58,208

[22] Filed: Jun. 4, 1987

[51] Int. Cl.[4] ........................................... G01N 21/88
[52] U.S. Cl. ................................ 250/563; 250/223 B
[58] Field of Search ................... 250/223 B, 562, 563, 250/572; 356/240; 358/106

[56] References Cited

U.S. PATENT DOCUMENTS

| | | | |
|---|---|---|---|
| 4,002,823 | 1/1977 | Van Oosterhout | 250/223 B X |
| 4,380,025 | 4/1983 | Deane | 358/106 |
| 4,403,294 | 9/1983 | Hamada et al. | 250/562 X |
| 4,428,672 | 1/1984 | Allord et al. | 250/563 X |
| 4,642,813 | 2/1987 | Wilder | 358/106 X |

FOREIGN PATENT DOCUMENTS

3314465  10/1984  Fed. Rep. of Germany ...... 250/563

Primary Examiner—David C. Nelms
Assistant Examiner—Steve McGowan

[57] ABSTRACT

An electrooptical system in which workpieces are illuminated from a generally uniform source of light and are line scanned for light intensity deviations characteristic of defects. Pulse trains from photoelectric detectors of a line array have pulse magnitudes which are a function of the light on discrete areas of the workpiece. Pulses having magnitude deviations from adaptively established signal levels are considered events characteristic of the defects. At the beginning of each scan the initial signals are rejected and the pulse train video signal is validated only after the video signal passed by a low pass filter exceeds a threshold. Thereafter data for the event signals of the scan are stored. In order to facilitate storage and processing of data, those event signals which occur for contiguous pulses are identified as event strings, and when an event string achieves greater than a threshold number of events, the stored data is compressed. In data compression, further storage of data and event counting are terminated until the end of the string. The data for the initial event of the string and for the end of the string is stored with a flag indicating that it represents compressed data.

38 Claims, 4 Drawing Sheets

METHOD OF AND APPARATUS FOR ELECTROOPTICAL INSPECTION OF ARTICLES

The present invention relates to electrooptical inspection methods and apparatus and in particular to the validation and compression of line scan video data collected during such inspection.

The use of optical scanning devices for inspection of transparent articles is well known. Systems such as those shown in U.S. Pat. Nos. 3,708,680 and 3,716,136, have circuitry including means for receiving and interpreting light passed through or directed onto an item subject to inspection. Such devices incorporate either a visual display for comparison of the item or employ a means capable of producing an electrical signal proportional to the intensity of light passing through, refracted from, or reflected from the item. The output of these devices is compared against a standard to determine if the item under inspection is suitable as to size and construction and is without unacceptable defects.

U.S. Pat. No. 3,877,821 discloses an apparatus having a scanning array of photosensitive devices that receives light from discrete areas of the item under inspection and is serially interrogated to generate a train of pulses having amplitudes representing the light received from the item. Adjacent pulses are compared to generate signals having amplitudes which represent the difference in pulse amplitudes. The different signals can be utilized to indicate a defect in the object being inspected. U.S. Pat. No. 3,942,001 discloses an apparatus for detecting the presence of extraneous matter or cracks in translucent containers. A beam of light is projected through the container to generate an inspection signal which is compared with an acceptance signal. The acceptance signal amplitude is varied in accordance with the position of the spot beam with respect to the container.

Glass bottles have been inspected utilizing data signals generated from a line scan camera having an aligned array of photodiodes, an optical system including a light source for directing light to a bottle and thence to the line scan camera, and means to advance bottles individually into the optical system and rotate them while in that system. A multiplicity of scans of the bottle at different rotational positions in the optical system enable all or a portion of the bottle sidewall to be inspected. Event signals, indicative of defects or foreign objects, are generated when the magnitudes of adjacent photodiode signals differ by an amount which exceeds a threshold level. Signals are also generated to identify the location of each event signal with respect to a corresponding photodiode and to identify the scan of the object in which the event signal was generated to associate the event signal with a location on the object. U.S. Pat. Nos. 4,378,494, 4,378,495, 4,432,013, 4,437,116 and 4,467,350 disclose such systems with adjuncts such as processing means for event signals to identify and evaluate adjacent defects in the same and/or adjacent scans and compare such processed signals with predetermined values to identify defects, means to display the event signals as to a two-dimensional representation of the surface of the bottle as if it had been cut and unwrapped, means to set threshold values to optimize defect detection performance, paired control units to alternately process inspection data and thereby speed the inspection process with one unit processing data while the other unit receives data, and signal comparison means for minimizing general light variations across the object.

Large objects which are transparent, such as the viewing faces of cathode ray tube faceplates, can be inspected employing line scan techniques. In U.S. Pat. No. 4,606,634 there is disclosed an arrangement for translating the viewing face of a faceplate through an optical system including a source of illumination on one side and means to pass light through the viewing area to a plurality of line scan cameras having their aligned photodiode arrays aligned. In the case of faceplate viewing surfaces, optical quality requirements dictate high resolution inspection. For example, three cameras each with one thousand twenty-four aligned photodiodes are disclosed in U.S. Pat. No. 4,606,634, to span the minor dimension of a rectangular faceplate.

In a system such as that disclosed in U.S. Pat. No. 4,606,634 defects can be sensed as darkened regions which reduce the output voltage of the diodes responsive to light transmission in the discrete viewing regions of the diodes. Thus a series of pulses are generated in time in response to an electronic scan of the arrays and reduced pulse magnitudes due to dark appearing defects are signified by reduced pulse magnitudes. Defects may occur in an infinite number of sizes, shapes and regions of the faceplate viewing area. The inspection systems repetitively scan the viewing area as it is carried through the viewing regions of the diodes. In order to locate sensed defects along a scan and relate them to sensed defects in other scans, each scan is recorded by count in memory and the defect signals are serially recorded for all scans. Large defects will result in a large number of defect signals along a large number of contiguous scans.

While systems of inspection may have a number of modes for reacting to detected defects including a rejection upon attaining a predetermined defect count for the entire viewing area, for a given unit area of the viewing area, or for a particular area of the viewing area, there are small defects which can be tolerated particularly if they are distributed and large defects which can be present as in marginal regions. Thus the distribution and size of the defects sensed also enter into the grading of product. Further the defect size, nature, location and density may provide useful information in regard to production control and therefore can be collected as inspection data. Faceplates can be displayed in whole or in part on display monitors or by means of plotters.

A preferred defect detection system as shown in the copending U.S. patent application Ser. No. 058,109 by J. W. V. Miller entitled "Method of and Apparatus for Comparing Data Signals in an Electrooptical Inspection System" employs a high pass filter which passes video signals which deviate from a weighted average video signal envelope so that the passed signals represent discrete areas of the workpiece from which light emanates at a different level than the general background. The high pass filter in its elemental form can be a series capacitance having its output connected to ground through a resistance such that a voltage level is developed at the output terminal of the capacitance which is a function of the background light intensity. At the beginning of each scan of the linear photoelectric cell array, the residual capacitance charge of the preceding scan is at a reference level, advantageously by grounding the output. As the train of video signals is begun, the time constant of the R-C circuitry permits the gradual build-up of the capacitance charge and thus the background illumination signal level. This build-up is accelerated by reducing the resistance to ground at the capacitance output of the high pass filter so that the capacitance rapidly follows the video signal level. When a threshold video signal level has been achieved, the threshold being set so it is above the reduced and erratic edge illumination, the high pass filters are enabled by removing the ground at their capacitance outputs whereby filtering is effective at the then imposed video signal levels without the time delayed build-up and defect response is gaged as pixel signal deviations from those levels. Thus the response to the erratic signals is inhibited and once an acceptable video signal level is achieved, that valid video signal is effective at the high pass filters for defect detection.

Video signal validation can be employed with the begin scan definition by sweep number and diode number as disclosed in the copending J. W. V. Miller U.S. patent application Ser. No. 058,207 entitled "Method of and Apparatus for Electrooptical Inspection of Articles" as a further enhancement or can be employed without such predetermined sweep limits.

The potential accumulation of data can require so much information processing that the speed of operation must be limited.

An object of the present invention is to compress the large defect data without loss of information concerning small defects. Other objects are to reduce the time required to process large defect data, to improve discrimination of the viewing area of a faceplate from the border regions, and to accommodate variations in light transmission in the central regions of transparent defects or blisters.

Additional objects of the present invention are to compress the large defect data developed without detrimentally affecting the small defect data collected; to initialize the circuits for data collection after compression of the data for large defects and at the beginning of each scan; and to inhibit the adverse effect of the drift of background illumination level as a scan of a large defect proceeds. Other objects are to reduce the time required to process large defect data, to improve discrimination of the viewing area of a faceplate from the faceplate border regions, and to accommodate variations in the background illumination level of large defects.

In accordance with the above objects, raw signals from the line scan camera are processed into different signal forms. The analog signal from each pixel representing a discrete area along the band of areas scanned in each sweep of the camera is high-pass filtered, then digitized and stored as a magnitude if the pixel signal has been sensed as an event representative of a defect. The analog signal is log transformed and then high-pass filtered, digitized and compared with a threshold level so that, if it is greater than the threshold, an event is indicated and the values of the diode count, the sweep count, and the signal magnitude are saved. Pixel signals from the edges of the faceplate viewing area are inhibited since the background illumination signal level providing the reference levels for the high-pass filters have not developed at the beginning of the scan.

At the end of each scan, the high-pass filters are inhibited and they remain inhibited until a valid video signal is detected in the next scan. Upon detection of a valid video signal, the high-pass filters are initialized. Thereafter, the high-pass filters respond by passing signals which deviate from the signal level for normal background illumination of the scan field. They employ series capacitance with a resistance to ground having a long time constant relative to the rate of scan of pixels. Filtering is inhibited in one arrangement by shunting the resistance to ground. This enables the current pixel voltage to be applied across the capacitance so that removal of the ground shunt leaves the capacitance at the current pixel voltage level. This filter initialization arrangement is also employed in the large defect data compression. Valid video signals are detected through a low-pass filter for the log processed analog signal from the pixels. The low-pass filtered signal is digitized and compared with the signal from a low-pass threshold register. When the filtered signal exceeds that from the register, the ground shunt on the high pass filter for the log processed signal and the raw video signal is removed to effect the initialization.

Large defects of the type which reduce the pixel signal level, such as the opaque defects known as stones and the refractive defects such as spherical blisters, reduce the high-pass filter base signals as the scan of the defect area progresses. As a result, at the end of a series of scanned pixels representing a large defect the high-pass filters are initialized in a manner similar to initialization to initiate detection of valid video signals at the beginning of each scan. The end of a defect for which data compression has been effective is sensed by low pass filtering of the log processed video and digitizing the filtered signal for comparison with a threshold signal from a threshold exceeded register, and when the requisite signal comparison is achieved, triggering a one-shot to ground the high-pass filters and initialize them at the video level present outside the defect along the scan band of discrete areas subject to inspection.

Compression of the large defect data involves saving pixel addresses, the diode and scan numbers, for the beginning and end of the defect pixel string and the setting of a flag to indicate that data has been compressed. As the scan of pixels progresses, those which represent events are saved in memory as to diode number, scan number and signal magnitude. Small defects are saved as a succession of contiguous events in the scan. Defects represented by a predetermined number or more of contiguous events cause data compression. As successive events are saved, the second event in the succession sets a pointer in a memory. A suppression counter is clocked by events so that upon achieving a threshold count indicative of a large defect it initiates data compression. In data compression the event memories for the string of events representing the large defect are reset except for the first event of the string as designated by the pointer. At the end of the large defect the data for the pixel at the defect margin are recorded and the beginning and terminating pixels are identified by a flag as representing compressed data. The central processor for the system recognizes the compressed data as representing a large defect and treats it accordingly without having to process the data for the string of individual events produced by the large defect, thereby facilitating the rapid processing of the data. The signal suppression and the data compression processes are cleared for short trains of events when those trains are terminated prior to the filling of the suppression counter.

The above and additional objects and features of this invention will be appreciated more fully from the following detailed description when read with reference to the accompanying drawings in which.

Figure 1:
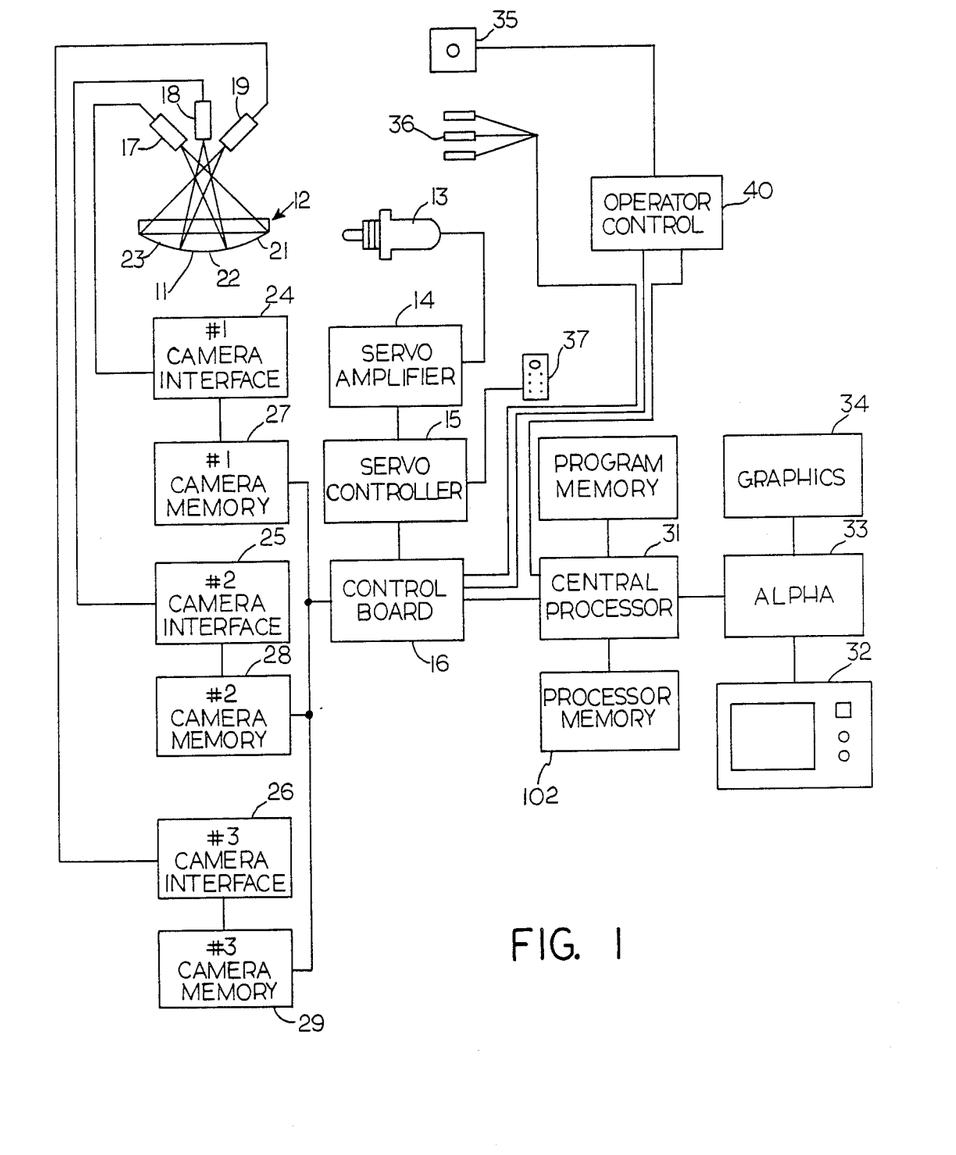
FIG. 1 is a block diagram of an inspection system for cathode ray tube faceplates which can include the data compression means of this invention.

A typical system employing the video scan signal validation and defect data compression method and apparatus of this invention is shown in FIG. 1 in conjunction with an electrooptical faceplate inspection system for detecting stones and blisters in the viewing region 11 of a flanged faceplate 12. Faceplate 12 is mounted in an optical system and on a cradle (not shown), as disclosed in greater detail in U.S. Pat. No. 4,606,634, the disclosures of which are incorporated herein by reference, which rocks it into and out of the paper, as viewed in FIG. 1, under the control of a servo motor 13 driven by a servo amplifier 14 from a servo controller 15. Servo controller is coordinated with inspection camera operations from a control board 16 so that scans of transverse bands of the viewing region 11 are made as the bands are positioned in the optical path to the cameras by the servo drive of the cradle. Typically a twenty-five inch rectangular faceplate (diagonal dimension) has a fifteen inch width and a twenty inch length and the system of cameras 17, 18, and 19 is arranged with three linear arrays of diodes each comprising two thousand forty-eight diodes which when aligned with a slight overlap may provide about six thousand pixels each of which corresponds to discrete viewed areas of the faceplate for each scan along the aligned array of fifteen inches of the minor dimension of the viewing region 11. The major dimension of viewing region 11 can be scanned in eight thousand scans as the faceplate is traversed through the band field of view of the cameras.

The number 1, 2 and 3 cameras 17, 18 and 19 are shown focused at regions 21, 22 and 23 respectively on the inner surface of faceplate viewing region 11 and a source of uniform light intensity (not shown) is directed on the outer surface of region 11 from below as viewed in FIG. 1. Each camera has a aligned array of photodiodes (not shown) which issue electrical signals as a function of the light intensity they receive from their respective discrete areas in region 21, 22 or 23 as the case may be, and thus as a function of the degree of transparency of those points or areas in an optical system that selectively excludes refracted light as described in U.S. Pat. No. 4,606,634.

The analog signal representing light at each discrete area is scanned in each camera as the diode array is scanned under control of a camera clock which can be on control board 16 and is processed for the system in individual camera interface circuits 24, 25 and 26 which ascertain those signals representing reduced pixel illumination as to threshold levels, diode number and scan number. Only those signals which may be indicative of a defect are recognized and designated "events" for the remainder of the processing functions of the system.

The magnitude, diode number and scan number of events are stored in respective camera memories 27, 28 and 29 and are accessed through control board 16 by the central processor 31 to develop inspection information. The central processor can issue grade classifications for the faceplates based upon the number of events, the location of the events and the magnitude of the events and any combination of these factors. The exemplary system has a resolution capability of about 3 mils and thus will detect defects which are essentially invisible to the human eye. Further, it will detect longer defects represented as a string of events which may or may not be significant to the utility of a display tube produced from the faceplate. With about two and one-half million pixels capable of being processed in each inspection, it is significant from the standpoint of processing time and efficient use of circuit memory that large defects are stored as the limits detected without storage and process of the events representing their entire areas. Small defects are stored and processed pixel by pixel.

Inspection system outputs can include a display of the viewing region 11 with the defects portrayed as to location, size and shape on a monitor 32, as data in alphanumeric form and graphically as developed by control circuits 33 and 34 coupled between the central processor and monitor 32.

Additional adjuncts of the system can include control switches represented by start button 35, cradle limit switches 36, servo manual controls 37, reset buttons, keyboards to set parameters, call up program menus and the like, many of which are not shown and are represented by the operator control 40.

Figure 2:
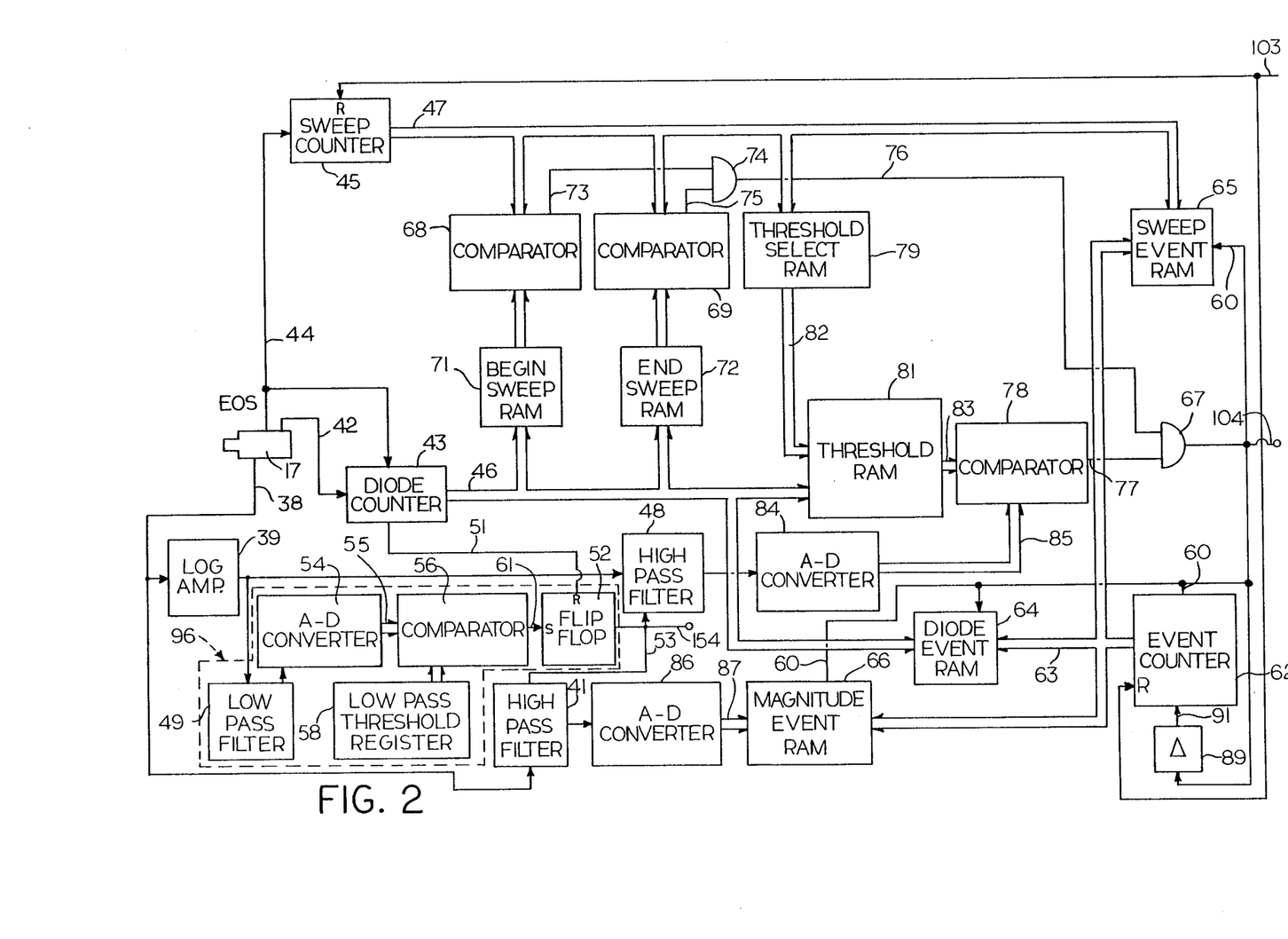
FIG. 2 is a block diagram of the general arrangement of the camera interface and memory circuits including the video validation of FIG. 1.

FIG. 2 is a block diagram of a camera interface and camera memory of FIG. 1 for validating the video signal and operating on that signal as it detects significant events representing diode signals characteristic of low light intensity at a pixel as they are scanned. Prior to signal validation, the video signal is grounded at the output of the high pass filters which detect events as deviations from a signal level representing the level of background illumination. When the video signal achieves a threshold level, the ground on the high pass filters is removed and the filter constant established by the resistance to ground of a series capacitance output for the balance of the sweep of the linear array. On the initiation of the next sweep the ground is again applied until the threshold level is detected.

A similar initialization of the high-pass filters at the end of the scan of a large defect is accomplished through the initial portions of the signal validation circuit to reset those filters to the background illumination level from which event detection is undertaken.

Inputs from the camera 17 and its controls include the analog signal input 38 which supplies signals from the currently scanned camera diode to logarithmic amplifier 39 and high-pass filter 41, camera clock input 42 to diode counter 43, and end of sweep input 44 to sweep counter 45 and diode counter 43 reset. Camera clock input 42 applies pulses corresponding to the scan steps for scanning the linear array of diodes in the camera and this results in an advancing pulse to the diode counter 43 which places that counter at the diode number of the currently scanned diode and thus the pixel number for the corresponding area on faceplate 11 surface region 21 subject to inspection. The diode counter 43 is reset at the end of each sweep of the diode array by a signal from the end of sweep input 44 so that its count starts from its reset value for each scan and it issues on "Diode Number" bus 46 the digital number designating the diode currently scanned. That end of sweep signal is derived from the camera scan control at the end of each diode array sweep to add a count to sweep counter 45 identifying the next scan number on "Sweep Number" bus 47. The logarithmic amplified video signal is passed from 39 to high-pass filter 48 and low-pass filter 49. Upon clocking the camera for the first signal of each scan, the high-pass filter outputs are inhibited until the video signal reaches a validation level. A reset of sweep counter 45 is issued at the end of each inspection routine by the central processor 31.

Events representing defects in the faceplate viewing surface 11 are represented in the video signal as signals of lower magnitude than that represented by the normal background level of illumination. High-pass filters 41 and 48 pass only these signals deviating from the background level for small defects, those extending across several diode viewing areas. When the filters have been subjected to signals from other than the normal background levels for periods which are long relative to the filter time constant, they establish new base levels so that diode signals which are different than those base levels are passed. In the cases of the beginning of a scan, the scan of areas including the glass flange adjacent the edges of the faceplate viewing region, and the scan of areas following a scan of a large defect, the high-pass filters are initialized to the valid video signal level so that the signals of subsequently scanned diodes are responded to when they represent events.

At the beginning of a camera scan, its diode counter 43 causes filters 41 and 48 to be reset by issuing a reset signal on lead 51 to flip-flop 52 which issues a signal on lead 53 causing the filter capacitances (to be discussed with respect to FIG. 3) to be grounded around the filter resistances. While flip-flop 52 is set, the signal on lead 53 maintains the grounding shunt open and the filters 41 and 48 effective.

Figure 4:
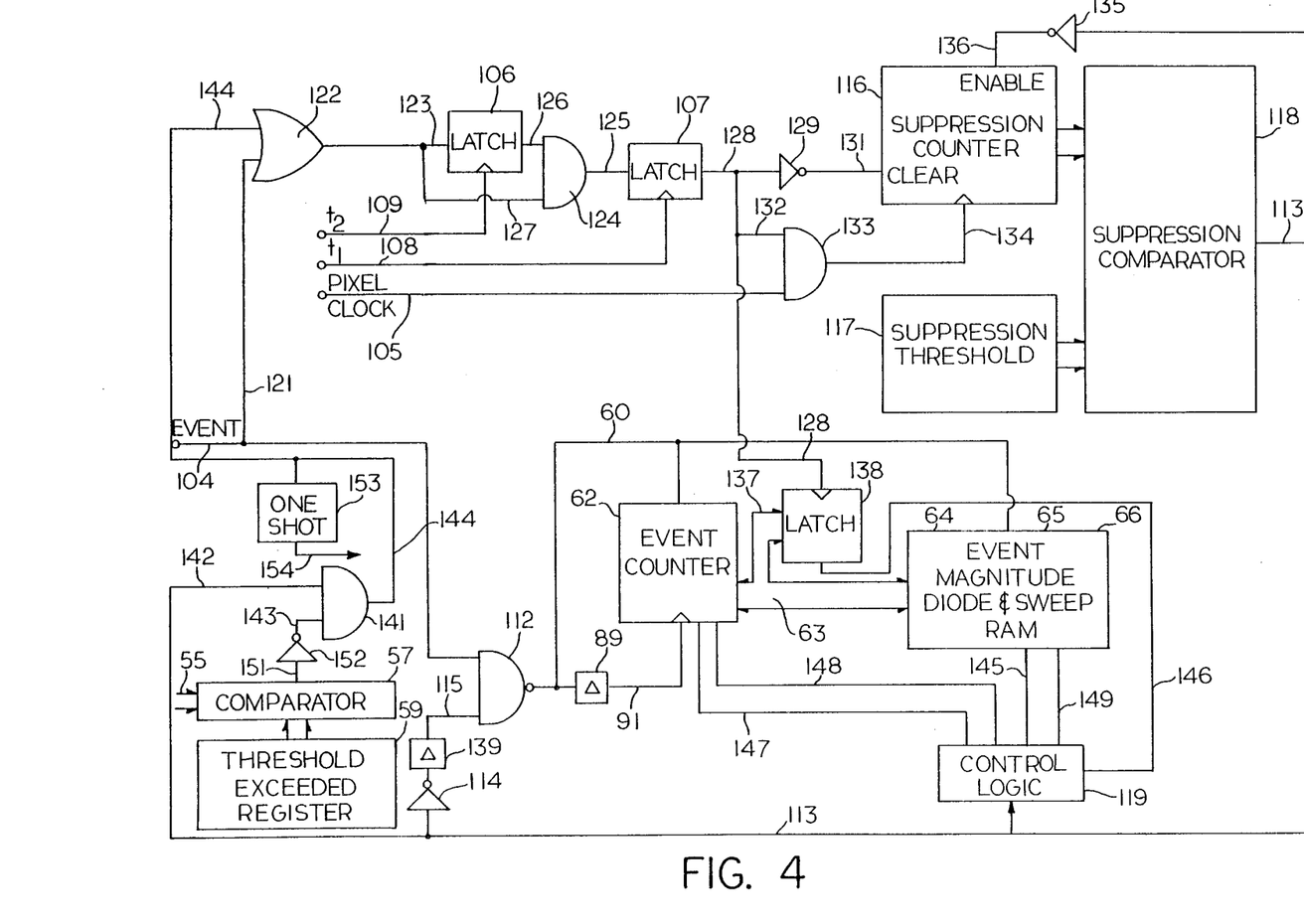
FIG. 4 is a block diagram of portions of FIG. 2 in greater detail to illustrate the data compression means of this invention.

At the beginning of each scan, flip-flop 52 remains in the reset state until a signal level from the camera 17 indicates valid video is present. Valid video on lead 38 is detected after it has been logarithmicly amplified at 39 through low-pass filter 49. The low-pass signal is digitized in analog-to-digital converter 54 and is passed on bus 55 to comparators 56 for scan start levels and 57 for scan suppression recovery levels (as shown in FIG. 4). Threshold register 58, for initiating valid video levels at the scan start, and threshold register 59 (of FIG. 4), for initiating valid video following scan suppression for large defect data compression, apply their digitized threshold signal levels to comparators 56 and 57 respectively so that the application of a threshold exceeding low-pass filtered signal from bus 55 causes the respective comparator 56 or 57 to issue signals.

When the video exceeds the threshold at the beginning of a scan, comparator 56 issues a "Video Valid" signal on lead 61 to the "set" input of flip-flop 52. The first clock pulse of camera 17 registered by diode counter 43 at the beginning of each scan causes the counter to issue a "reset" signal on lead 51 to flip-flop 52. In its reset state, flip-flop 52 causes the grounding of the output of the series capacitance in high pass filters 41 and 48 by its signal on lead 53. When the low pass filtered video exceeds the threshold defined by register 58, comparator 56 applies a "set" signal on lead 61 to flip-flop 52 to remove the ground on the capacitance output of filters 41 and 48 thereby enabling them to respond to deviations from the video signal level established across the capacitance by passing those signals as valid video signals to the respective event detection and event magnitude sensing circuits.

The significant data to be created in the system is the occurrence of events or sensed optical changes indicative of defects or blemishes. Event RAM address data is derived from event counter 62 over "Event RAM Address" bus 63 to cause the event memories to store the diode number of the event in "Diode Event" RAM 64, the sweep number of the event in "Sweep Event" RAM 65 and the magnitude of the event in "Magnitude Event" RAM 66. Event memories 64, 65 and 66 are loaded simultaneously. These event circuits are enabled through "Event Enable" AND 67 in response to a signal from the currently scanned diode of a magnitude greater than the predetermined threshold signal magnitude for that diode during that scan, provided the signal is a valid video signal and derived from a diode within the predetermined window for that sweep.

The window of acceptance of diode signals as events is defined by sweep and diode numbers for the beginning and end of each sweep by "Begin Window" comparator 68 and "End Window" comparator 69. The effective sweep number is supplied in digital form on bus 47 to each of comparators 68 and 69. The currently scanned diode number on bus 46 is supplied to "Begin Sweep" RAM 71 and "End Sweep" RAM 72. A predetermined, individual sweep number to begin the sweep window is set for each diode in RAM 71 and a predetermined, individual sweep number to end the sweep window is set for each diode in RAM 72. Each of RAMs 71 and 72 are arranged to issue digital sweep numbers to their respective comparators 68 and 69 for each digital diode number from "Diode Number" bus 46. When the sweep number on bus 47 from "Sweep Counter" 45 is equal to or exceeds the sweep number in the RAM 71 at the diode count address, comparator 68 issues a "true" enable signal on lead 73 to a coincidence gate 74 requiring "true" signals on both of its inputs to issue an enable signal for the issuance of an event signal. The "Window Defining" AND 74, if enabled by a "true" state on lead 75, is gated through lead 76 to "Enable Event" AND 67. Comparator 69 issues a "true" signal on 75 until the diode address of the sweep applied to "End Sweep" RAM 72 causes that RAM to apply the sweep number digital signal appropriate to end that sweep. When the "End Sweep" signal is issued by comparator 69, AND 74 is inhibited, causing it to remove the true state on lead 76.

Coincidence of enabling signals on leads 76 and 77 gates AND 67 to trigger event counter 62 and issue "Save Event Data" signals on lead 60 to each of the "Sweep Event" RAM 65, "Diode Event" RAM 64 and "Magnitude Event" RAM 66. A diode signal exceeding the predetermined threshold magnitude results in a signal on lead 77 out of comparator 78.

Each sweep can have threshold levels set for its individual diodes according to the sweep number on bus 47 to "Threshold Select" RAM 79. RAM 79 provides look up tables from which thresholds are set. A convenient arrangement is to provide four available series of threshold levels in "Threshold" RAM 81, one of which is selected via the output 82 of "Threshold Select" RAM 79 for each sweep number. The diode number currently subject to scan is applied to "Threshold"

RAM 81 from "Diode Number" bus 46 so that the threshold digital signal level for the effective sweep and diode is issued on bus 83 to comparator 78. Analog to digital converter 84 responds to the logarithm of the analog magnitude signal from the diode currently subject to scan as issued by logarithmic amplifier 39 through high pass filter 48 to provide a digital magnitude signal to comparator 78 on "Diode Logarithmic Magnitude" bus 85, as disclosed in greater detail in the cofiled U.S. patent application Ser. No. 058,109 entitled "Method of and Apparatus for Comparing Data Signals in an Electrooptical Inspection System" by John W. V. Miller. If that magnitude is in excess of the threshold digital signal set by "Threshold" RAM 81, comparator 78 will pass an enable signal on lead 77 to "Event Enable" AND 67.

Analog diode signals from camera 17 are passed on lead 38. In order to enhance the extraction of information from the video signal made up of the diode signals on an illumination invariant basis, nonlinear filtering is employed. In U.S. Pat. No. 4,432,013 a subtraction of successive logarithms of digital signal values of analog camera diode signals is employed by passing the camera video through an analog to digital converter, latching the first digitized diode signal, ascertaining the logarithm of that digital value, and summing it with the logarithm of the next diode signal digital value. Thus, a slowly changing light level variation at the camera results in small logarithmic differences which are not registered as optical defects while abrupt changes are registered as defects. In the present illustrative arrangement, the video signal envelope of the signal levels of a scan of the diodes in the line scan camera is subject to high pass filtering so that it responds directly to the individual pixel analog signal deviations from the weighted average over the group of pixels scanned previously, permitting the use of analog filters and a more direct treatment of the signal as shown and discussed in greater detail in the aforenoted copending U.S. patent application Ser. No. 058,109.

Those abrupt changes in detected light during a scan are passed by two channels each including a high pass filter while slow changes are blocked by the filters. The camera analog signals on lead 38 are utilized for absolute magnitude values in "Magnitude Event" RAM 66 by filter 41 and converter 86. Those camera signals are converted to logarithmic values by logarithmic amplifier 39 which responds to light flux intensity at the pixels as logarithmic values which are relatively constant over the smooth portion of the video. Those gradual changes of signal which would result from gradual changes of light level are not passed by high-pass filter 48 and have no effect on the following converter 84 or comparator 78. The abrupt changes of the logarithmic signal as would occur as a darker pixel is scanned are passed by high-pass filter 48 to analog to digital converter 84 and transmitted to comparator 78. The logarithmic values employed when high-pass filtered, respond to the degree of change of the video signal and not the absolute value of change due to the conversion, yet signal filtering can be analog and thus more readily tailored to the system.

Illumination invariant event detection is achieved by the high-pass filtering of the logarithmic signal of scanned pixel illumination intensity. For example, a defect which darkens a pixel so that its diode issues a signal which is fifty percent of the signals of diodes for pixels previously scanned and constituting the background illumination level in that region will produce a logarithmic signal differing from the background illumination. The high-pass filter 48 will pass only the portion of the logarithmic signals representing the deviation and of a level which is a function of the deviation from its background signal without regard to the absolute value of the background signal level.

Regularly experienced patterns of varying light transmission over the faces of workpieces within the limits of the enabled portion of the scanned array, as defined by the gating of AND 74, are accommodated by adjustment of light sensitivity, the light responsive signal threshold of deviation, for the areas in which those patterns occur. Typical patterns are the markings applied to identify the workpiece, such as mold identification applied to CRT faceplates, and tool marks on the workpiece, such as lehr mat marks which occur in the areas of the faceplate contacted by the lehr mat. These patterns occur on predictable areas of the workpiece and may be of a degree of translucence such that defect changes in translucence remain detectable in the inspection system. Thus, a workpiece identification or a tool mark will be present on the same areas within the area subject to optical inspection from workpiece-to-workpiece and the sweep numbers and diode counts at which light transmission levels are shifted from the levels for defect and mark free areas, the background level, are predictable. Further, the degree of change of light transmission from the background level at those locations is also predictable.

Those marks which will not detract from the ultimate quality of the workpiece can be effectively excluded from the inspection process by establishing threshold signal levels which render the inspection system event signal generating means non-responsive to light transmission changes characteristic of the marks when the system is inspecting the areas in which the mark patterns are predicted. A high-pass filtered analog logarithmic signal from logarithmic amplifier 39 and high pass filter 48 is converted to a digital signal in converter 84 and applied to comparator 78 which gates AND 67 if the applied signal is equal to or greater than the threshold level applied to the comparator. Adjustment of threshold levels applied to comparator 78 according to the workpiece area currently subject to inspection enables the regularly occurring patterns in the workpiece to be accommodated, either by causing the system to disregard the areas containing those patterns by setting threshold levels above those anticipated under any reasonable condition, or by raising the threshold levels to bar comparator response to the regular patterns while responding to anomalies which would be characteristic of defects within the area of the pattern of markings. Thus, no response would result in an event detection if the threshold were set for one hundred percent or total light elimination from pixels in the pattern areas and, in effect, the inspection window of the system would be defined by the effective sweep of each of the individual scans and the blanked portion of the individual scans as defined by the threshold settings for the pattern area between the ends of those sweeps. Alternatively, a setting of an intermediate threshold, for example one slightly above the signal level anticipated for the reduction of light intensity at the pixels in the pattern for the workpiece identification mark or tool mark, would enable a response of an event detection signal in the pattern area where the cumulative effect of the anticipated pattern and a defect in the pixel area produces a signal above the intermediate threshold setting.

The filtered analog video out of the high pass filter 41 is converted to a digital signal representing the magnitude of the transmition from the video base value due to the abrupt change in light intensity by analog to digital converter 86 and is passed on bus 87 as a digital signal to "Magnitude Event" RAM 66. Again the gradual changes in the video signal magnitude are filtered at 41 and only the abrupt changes are effective in following circuits. In order to enhance high pass filtering as an effective means of extracting event signals from a string of diodes, the camera scan rate for the diodes is maintained constant and the time constant of the filter is long relative to the individual pixel scan intervals. In the present example, a fixed clock frequency of five megapixels per send is maintained.

AND 67 by issuance of the "Save Event Data" signal on 60 triggers the setting of the memory location of the sweep number, diode number and magnitude of the events through the event counter 62 on bus 63 as an event ram address for the "Sweep Event" RAM 65, "Diode Event" RAM 64 and "Magnitude Event" RAM 66. It issues a "Save Event Data" signal on lead 60 to each of RAMS 65, 64 and 66 so that the current sweep number on bus 47 is stored at its designated memory location in RAM 65, the current diode number from which the event signal was derived as present on bus 46 is stored in its designated memory location in RAM 64 and the event magnitude is stored in RAM 66 at its designated memory location. "Save Event Data" signal, the event signal, from AND 67 increments the event counter 62 after a delay sufficient to enable storage of the data in RAMs 65, 64 and 66 by passing that signal through delay 89 to the increment input 91 of counter 62.

Thus those events within the window defined between the limits set by "Begin Sweep" RAM 71 and "End Sweep" RAM 72, diode and sweep numbers and which meet the threshold of magnitude defined for the diode and sweep number by "Threshold" RAM 81 are saved in "Sweep Event" RAM 65, "Diode Event" RAM 64, and "Magnitude Event" RAM 66 for processing by central processor 31.

In order to avoid the effect of spurious signals from pixels at the beginning of each scan and to initialize filters 41 and 48, definition of the effective pixels of each scan is provided by circuitry which adaptively locates the effective edge of the light field in the camera array and thus on the workpiece on every sweep of the camera. The high pass filters 41 and 48 pass abrupt signal changes from levels developed by the scan of preceding portion of the linear array of diodes so that the signals to converters 84 and 86 are deviations from a video envelope developed as a running average of the signal magnitudes from previously scanned diodes representing the background illumination intensity from the light field. At the beginning of each scan that envelope signal level is not available as a valid video signal due to camera signal recovery from the transition from dark to light. Further, erratic lighting occurs at the edges of a workpiece subject to inspection, in the case of a CRT faceplate having bordering flanges. The flange and the transition region between the flange and the viewing face can produce jagged light patterns which might be recorded erroneously as a defect. A light field edge detector is provided to hold the circuit reset until an appropriate light level has been established for the scanning process and to facilitate the establishing of that corresponding signal level on the high pass filters 41 and 48.

Figure 3:
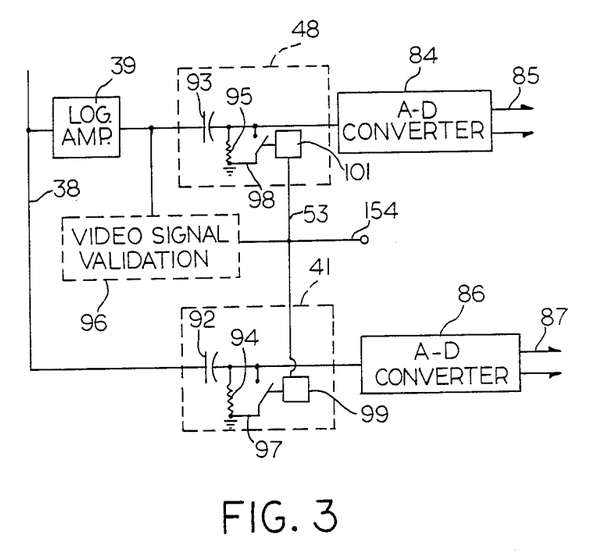
FIG. 3 is a simplified schematic diagram of the video signal validation illustrated in FIG. 2 showing the control within each of the high-pass filters for inhibiting the issuance of signals to the system until an acceptable video level has been achieved and for rapidly establishing a base video level for the current light intensity.

If one considers the high-pass filters 41 and 48 the equivalent of a series capacitance 92 and 93 followed by a resistance 94 and 95 to ground as represented in FIG. 3, it will be appreciated that some time is required for the illumination level signals at the initiation of a sweep to develop the video signal as a charge across the capacitor. The video signal validation circuit 96, as discussed above and shown in greater detail in FIG. 2, imposes a shunt 97 and 98 to ground around the resistance 94 and 95 of each filter 41 and 48 to essentially instantaneously charge the capacitors 92 and 93 of those filters while preventing the imposition of a signal on converters 86 and 84. At the beginning of each camera scan, the filters 41 and 48 are held reset by a shunt to ground of the output terminals of capacitances 92 and 93. This shunt is removed by a signal to switch actuators 99 and 101 in the filters when the logarithmic amplified video signal from amplifier 39 is low pass filtered in low-pass filter 49, an analog filter, and applied to analog-to-digital converter 54 and thence to comparator 56. This low-pass filtered, logarithmic amplified, video signal is compared against a software set signal value set as a digitized signal in "Low-Pass Threshold" register 58 for application to comparator 56. When the low-pass signal exceeds the comparison value comparator 56 issues a set signal on lead 61 to flip-flop 52 which causes the switch actuators 99 and 101 to open the shunts to ground in high pass filters 41 and 48. The filter capacitor is charged to the current pixel signal level producing the comparison value for immediately following pixels in the scan and enabling the camera interface and memory circuits to become active as event responsive elements for subsequently scanned pixel diodes.

Once the shunt is opened, it is held so for the balance of that scan by flip-flop 52. Following the end of the scan, the flip-flop is reset. In the example reset is on the first count of the next scan by a signal from diode counter 43 on lead 51. Thus, at the initial portion of each scan the output terminal of the capacitance is grounded and the voltage across the capacitance follows the pixel signals of the raw video until the threshold level is achieved and video signal validation sets the flip-flop 52 in circuit 96.

The field edge detector when set to the proper threshold defines the onset of a valid video signal, prevents jagged light patterns which may be experienced at the beginning of a scan from being erroneously recorded as defects until the threshold is achieved, and it rapidly enables the event detection of comparator 78 through high pass filter 48 and the defect magnitude detection through high pass filter 41 at such threshold. It can operate in conjunction with the definition of an effective sweep through "Begin Sweep" RAM 71 and comparator 68 or it can be employed without such definition either by setting "Begin Sweep" RAM 71 to enable AND 74 at the first diode count of each sweep or by eliminating the sweep limiting circuit.

Central processor 31 processes the data saved in the processor memory 102 after it has been transferred to that memory from "Sweep Event" RAM 65, "Diode Event" RAM 64, and "Magnitude Event" RAM 66. Control board 16 generates the signals to the cameras to acquire data, communicates with the servo controller to issue instructions such as "Center Cradle", "Cycle Cradle" or "Return to Home Position" and to pass saved data to the central processor. The executing program for the central processor board 31 issues commands to acquire data from the memories, analyzes the data and issues a decision about the inspected faceplate based on that analysis. It also communicates with the operating attendant through the video subsystem. At the end of an inspection routine analysis, the central processor issues a clear signal on lead 103 to the "Sweep Counter" 45 and the "Event Counter" 62 to reset those counters for the next inspection cycle.

Data collected in the exemplary system is ordinarily so sparse that the central processor can perform its processing of information for an inspection cycle in the time interval available for loading a workpiece in the inspection apparatus, running the video inspection on the workpiece and unloading the workpiece so that processing can be performed in a single central processor in synchronism with the flow of workpieces through the video inspection. In order to avoid saturation of the central processor and the memories where very large defects are encountered, the amount of data stored and processed for such defects is reduced. As the camera scans over a defect, a count is kept of the number of event signals being stored in each string of events made up of signals from contiguous pixels. If the count exceeds a software set value, the system reduces the stored data to contain only the pixel data defining the limits of the defect. The stored data, other than that of the first event signal of the string, is cancelled and a marker imposed in storage to identify that data has been compressed for a large defect and the terminal identifying data for the string is placed in memory. Memory is economically utilized by inserting the terminal pixel identifying data adjacent the initial pixel identifying data for the string. By this means the effective outline of the very large defects is retained rather than data for the entire defect while data for smaller defects is retained entirely. The means of such event string length measurement, event storage suppression and data storage compression is illustrated in FIG. 4.

Less transparent areas of the object being inspected are represented by reduced pixel signals. For large defects the reduced levels persist over a scan interval sufficient to reduce the base level of the signals passed by high-pass filters 41 and 48. Even with long filter time constants the base signal level ultimately converges with the individual pixel signal level so that event signals are swamped out. Beyond a suitable threshold of contiguous event counts the signals are suppressed. Such suppression is continued until a video signal level representative of the absence of defects is encountered along the scan of pixels. At the end of the defect, the high-pass filters 41 and 48 are initialized to set their base levels at the defect free video level so that the system again responds to defects encountered along the scan. It is to be appreciated that the suppression threshold, the pixel count of contiguous events, is set short of the string of events which would result in the swamping out of the event detection and that the suppression process is latched during the swamped out event detection and is terminated at the end of the defect.

Figure 5:
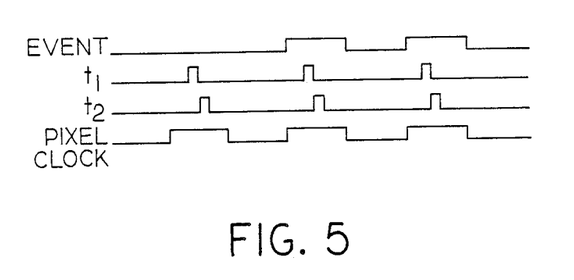
FIG. 5 is a signal timing diagram for sequencing operations illustrated in FIG. 4.

FIG. 4 in part duplicates the system and elements of FIGS. 1 and 2 and includes the augmenting elements for signal suppression and their relationship to event counter 62, the "Diode Event" RAM 64, "Sweep Event" RAM 65, and "Magnitude Event" RAM 66 of FIG. 2. Like reference characters have been employed in the several figures for like elements to illustrate the linkage of the disclosures. Each event signal issued on lead 60 by gate 67 of FIG. 2 is imposed at input 104 of FIG. 4 as is pixel clock signal at lead 42 of FIG. 2 at input 105 of FIG. 4. Event signal latches 106 and 107 are sequenced to pass signals of events at contiguous pixels along a scan by sequencing signals applied at leads 108 and 109 and clocked with the pixel clock signals applied at input 105. The timing relationship is shown in FIG. 5 where the regularly occurring pixel clock signal is coincident with event signals when the pixel which is clocked is registering an event and sequencing signals occur over interval $t_1$ on input 108 and over interval $t_2$ on input 109. Interval $t_1$ precedes and is non-coincident with interval $t_2$ and both intervals are coincident with the event and pixel clocking signals.

Event counter 62 and event RAMs 64, 65 and 66 are shown in FIG. 4 in a modified configuration from that shown in FIG. 2 to illustrate the signal suppression features. "Save Event Data" signals derived from AND 67 of FIG. 2 are passed to event signal input 104 of FIG. 4 and that signal is represented on lead 60 of FIG. 4 applied to the RAMs 64, 65 and 66 and the enable input of counter 62 directly and to the count incrementing input of event counter 62 through AND gate 112. AND 112 inhibits incrementing event counter 62 when signal suppression is effective to make lead 113 high so that inverter 114 makes lead 115 low. The circuit of FIG. 4, in addition to counting events in event counter 62, as described for FIG. 2, and storing event diode and sweep identification in RAMs 64 and 65 and event signal magnitude in RAM 66 derived from respective buses 46, 47 and 87 (not shown in FIG. 4), as described for FIG. 2, counts the second and succeeding events of a series of contiguous events of a sweep in "Suppression Counter" 116, compares the count in that counter to a software set threshold value defined by "Suppression Threshold" RAM 117 by "Suppression Comparator" 18 which issues a signal suppression signal to lead 113. When the suppression signal is present on lead 113, "Suppression Counter" 116 is inhibited as are "Event Counter" 62 and the event magnitude, diode and sweep memories 66, 64 and 65.

At the end of a string of contiguous event pulses, the suppression signal 113 is removed. The address in the memories for the second count of the string is applied to the "Event Counter" 62 to define the addresses in memories 64, 65 and 66 for the data defining the end of the scan. The "Suppression Counter" 116 is enabled. Control logic 119 sets a "Compressed Data Flag" in "Event Magnitude" RAM 66 and a diode and sweep count for the pixel pulse following the end of the event string at the storage address for the second event of the string in RAMs 64 and 65. After a delay following removal of the suppression signal, the "Event Counter" 62 is enabled for regular event counting.

The high-pass filters 41 and 48 are initialized and the suppression signal system is reset to enable event detection of small defects and the signal suppression of large defects to compress data by detecting the presence of a valid video signal as the scan passes from the large defect to areas having signals characteristic of the absence of a defect. Detection of this transition and the control of the high-pass filters 41 and 48 involves operations and circuitry as described with respect to video signal validation circuit 96 of FIGS. 2 and 3.

As shown in FIG. 4, the detection of events and high signals on lead 104 are applied through gated AND 112 to the incrementing input and the enable input of event counter 62 as described in FIG. 2. In addition, events forming a string are counted. A high event signal on 104 is passed on lead 121 to OR gate 122 and then to latch 106 via lead 123.

As shown in FIG. 5 the pixel clock signal at input 105, which for purposes of discussion can be coincident with an event signal in lead 104, if one is present, has a leading edge in advance of the leading edges of sequencing, time pulses $t_1$ on input 108 and $t_2$ on input 109. Latch 106 is enabled on the leading edge of $t_2$ and latch 107 is enabled on the leading edge of time pulse $t_1$. Hence, at time $t_1$ of the first event signal latch 107 is enabled but latch 106 and AND 124 are inhibited so that input 125 is low, thus latch 107 is not set. At time $t_2$ of the first event signal latch 106 is enabled to make its output 126 to AND 124 high while the event signal input 127 is high to gate AND 124 and apply a high signal on latch input 125. Latch 107 is not enabled at this time since $t_1$ interval has expired. On the second and following contiguous event signals latch 106 is set and holds a high signal on lead 126 to AND 124. The event signal on 104 holds high for the second and subsequent contiguous event signals at the leading edge of the sequencing pulse $t_1$ so that AND 124 makes input 125 high and latches latch 107 to issue a high signal on output 128. A high signal on 128 removes the clear signal through inverter 129 to the clear input 131 of "Suppression Counter" 116. High signal on 128 is also applied to input 132 to AND 133 coincident with high pixel clock signal at input 105 to gate 133 high to the incrementing input 134 of counter 116. At this time, the suppression count is below the level set in "Suppression Threshold" source 117 so the output on 113 from suppression comparator 118 is low. Inverter 135 in 113 places a high enable signal on enable input 136 of suppression counter 116 so that the counter advances a count for each event signal contiguous in sequence with a proceeding event signal on lead 104.

Storage addresses issued by "Event Counter" 62 for the "Magnitude Event" RAM 66, the "Sweep Event" RAM 65 and the "Diode Event" RAM 64 are latched on the second event of a string so that data for the end of the string can be placed at those addresses. "Event Counter" 62 is issuing storage addresses for each event on bus 63. Event signals clock counter 62 each time lead 104 goes high to gate AND 112 since lead 115 is high due to inverter 114 and the low signal on signal suppression lead 113. A delay is introduced in the clock input 91 by delay 89 to insure the "Save Data" signal from AND 67 of FIG. 2 is effective for RAMs 64, 65 and 66 at the time their storage addresses are stable.

Event counter 62 issues a digitized memory address on bus 63, a branch 137 of which inputs bidirectional latch 138. Latch 138 is enabled on the second event of the event signal string by a high signal on lead 128 so that it stores the memory address issued by the event counter 62 during that interval. Lead 128 is latched high by latch 107 during the string of event signals thereby holding latch 138 in its state set at the second event signal of the string.

A string of event signals on input 104 maintains latches 106 and 107 latched. Inverter 129 inhibits clear input 131 for each pixel clock pulse on input 105 for which an event signal is imposed on input 104. Upon the termination of the string of event signals prior to advancing the suppression counter 116 to the threshold for data compression, the input 123 from OR 122 remains low at $t_2$ so that latch 106 is reset to inhibit AND 124 and reset latch 107. The low signal on lead 125 results in a high signal on the clear input 131 of counter 116 to clear the counter, the low signal on 132 inhibits AND 133 to counter incrementing input 134 of counter 116, the low signal to the clocking input of latch 138 permits the latch to be reset to a new storage address upon the occurrence of the second event signal of the next following string of event signals. The signal suppression control circuits are thus reset for following event strings when a short string ends without reaching the suppression threshold count.

A data compression signal is issued when the count of events for a string as accumulated in counter 116 achieves a value matching the preset count in "Suppression Threshold" source 117. At that time suppression comparator 118 issues a high signal on output 113. This inhibits the "Suppression Counter" 116 through inverter 135 which applies a low signal on enable input 136 and inhibits the event counter by inhibiting AND 112 through inverter 114 and delay 139 to input 115. Delay 139 is of a length to permit the control logic 119 to function prior to the inhibiting of the counter 62.

A string of events which is of a length to advance the count in suppression counter 116 to the suppression threshold can extend for a time interval sufficient to swamp out event signal detection by high-pass filter 48. The base signal level for detection of background illumination deviations decays with time to the signal level produced by the defect illumination level. Accordingly, once data suppression is initiated it is latched until released by a pixel signal representative of a valid non-defect video level detected in much the same manner as at the beginning of a scan. The data suppression signal issued by comparator 118 on lead 113 is passed to AND 141 on branch lead 142 of lead 113. AND 141 is enabled by a high signal on its input 143. AND 141 maintains a signal on its output 144 to OR 122 which maintains a hold signal on latch 106 through 123 even after the high-pass filter 48 has its base signal decay toward the level of the pixel signals representing the darkened defect.

Control logic 119 is actuated by the application of the data suppression signal on lead 113. It applies the storage address of the second event of the string to RAMs 64, 65 and 66 and issues a data compression flag to the event memories on lead 145, e.g., as a marker on one of the extra bits in the eight bit "Magnitude Event" RAM 66 which requires only six of its eight bits to store event magnitude data. The data compression flag is set at the second event address determined by the issuance of that address to counter 62 by latch 138. Control logic 119 operates on a tristate control input 146 to latch 138 to cause data flow so that the second event memory address is inputted to event counter 62 on bus 63 of branch 137. It operates on a tristate control input 147 to counter 62 to enable that second event memory address to be accepted as the current data address issued by counter 62 to RAM 66 for the data compression flag storage.

Continuing event signals following a signal suppression signal on lead 113 are disregarded by suppression counter 116, event counter 62 and the memories 64, 65 and 66. At the beginning of pixel signals at the level characteristic of no defect which follow a string of event signals, AND 124 is inhibited, latch 107 is dropped on the next $t_1$ pulse, "Suppression Counter" 107 is cleared and "Suppression Comparator" 118 has its suppression signal removed from output lead 113. The removal of the suppression signal actuates the control logic to impose a load signal on lead 148 to "Event Counter" 62 and a write signal on lead 149 to RAMs 64 and 65 so that the RAM addresses dictated by event counter 62 are those of the second event of the string and the diode and sweep numbers recorded in RAMs 64 and 65 are the diode number of the next pixel and the sweep number of the current sweep applied as shown in FIG. 2 from buses 46 and 47. This reading of the next diode following the termination of the event string is facilitated by the delayed enabling of AND 112 by delay 139 to insure that reset transients are complete and a reliable signal is available to the memories. It will be noted that the size of the defect represented by the difference between the first event diode number and the first pixel clocked after the terminal event signal do not place both signals within the string. However, the central processor can be arranged to compensate for the displacement by one additional diode if it is significant to the signal processing. Further, on large defects no magnitude values subsequent to the first event are stored since only the definition of the location of the edges of the defect are considered.

Upon the generation of data suppression signal on leads 113 and 142, enabled AND 141 maintains a signal to hold latch 106 even though the event signal on 121 decays. AND 141 is disabled upon the restoration of the pixel signal level to that characteristic of no defect. As the scan advances from the last pixel subject to the defect to the next pixel at the no defect level the enable signal on input 143 to AND 141 goes low to disable the AND thereby initiating the reset sequence for latches 106 and 107. That video signal representative of no defect is derived from the log amplifier 39, low pass filter 49, analog-to-digital converter 54, and digital bus 55 as shown in FIG. 2 and discussed with respect to the validation of video signals at the beginning of a scan. The low-pass filtered and digitized signal is applied to comparator 57 whose threshold is set in "Threshold Exceeded" register 59. When the low-passed signal exceeds the set threshold in 59, comparator 57 issues a high signal on lead 151 which is inverted to a low signal on lead 143 by inverter 152 thus inhibiting AND 141 by lead 143.

As the output on lead 144 of AND 141 goes low it triggers one-shot 153 which applies over lead 154 an actuating signal which is present momentarily to lead 53 in FIGS. 2 and 3 to switch actuators 99 and 101 in high-pass filter circuits 41 and 48. The actuators 99 and 101 close the ground shunts 97 and 98 around resistances 94 and 95 causing the capacitances 92 and 93 to be charged to the video signal level of the defect free pixel area exceeding the threshold in 59. The filter shunts are then reopened upon the expiration of the one-shot signal interval and the filters 41 and 48 are initialized for further detection through application of event signals on lead 104.

After the load and write signal responses have been completed and the terminal data stored, the circuits are reset for data collection for defects represented by event signals. The sequencing in control logic 119 resets the tristate control signals on 146 and 147 and removes the load and write signals on 148 and 149 so that event counter 62 is conditioned to count event pulses on 91 and issue memory addresses on bus 63, latch 138 is conditioned to be set at the second event of the next encountered event string, and RAMs 64, 65 and 66 are prepared to receive their small defect data from buses 46 and 47 and converter 86 respectively. The resetting of the signal suppression and data compression also prepares the system for large defects, those having event string counts exceeding that set in threshold 117, including the data compression flag, initial and end of string diode counts for defining the string, and the sweep count. The central processor is programmed to respond to the data compression flag during its processing of the information derived from RAMs 64, 65 and 66.

Predetermined parameters are set in the system as through a keyboard at operator control 40. The begin sweep diode count for each sweep set in RAM 71 and end sweep diode count for each sweep set in RAM 72 can be set to define the window margins as to diode number and sweep number. "Threshold Select" RAM 79 provides a look up table to assign any of n threshold values for the diodes of a sweep as set by operator control. Signal validation threshold values can be set for 58 and 59 and suppression threshold values can be set for 117 at control 40. Thus the diode, pixel, or object area number along the band of a sweep, the sweep number, and the threshold signal magnitude can be predetermined selectively to define the inspection window, the threshold magnitude areas, the signal validation levels and string length for data suppression.

These concepts can be employed in systems having different video signal sensing means from those disclosed. High pass filtered video can be viewed as spikes from a reference level occurring at the scan of pixels whose signal magnitude deviate from the video envelope and to a first order signal magnitudes deviating from the general reference level developed at the pixels free of defects and subject to the uniform light flux and the gradual deviations from uniformity of a non-defect type such as glass thickness changes. Pixel-to-pixel difference defect detection can be employed in place of the high-pass filter defect detection with the data suppression. For example, string definition and data suppression can be employed for event signals developed in illumination invariant image processing systems as shown in U.S. Pat. Nos. 4,432,013, 4,437,116 and 4,467,350.

It is to be appreciated that the above disclosure is a preferred embodiment of the adaptive video signal validation, location of the sweep edge and the data compression and that variations can be made employing the principles of this invention in other embodiments with other components without departing from its spirit or scope.

What is claimed is:
1. An electrooptical inspection system comprising:
a line scan camera having a linear array of photoelectric cells;
a mount for maintaining a workpiece to be inspected in the field of vision of said line scan camera whereby each of a plurality of the photoelectric cells of said camera issues an electrical signal which is a function of the light emanating from a discrete area of the workpiece;
means to detect deviations in the magnitude of individual photoelectric cell signals from a base signal which is a weighted average magnitude of a plurality of photoelectric cell signals developed during a camera scan;
means to repetitively scan the linear array;
means to initialize said means to detect deviations to at least a base signal of a given magnitude essentially the weighted average magnitude at the begin- ning of each scan of said photoelectric cells during a portion of the scan of the linear array.

2. A system according to claim 1 including:
means to inhibit said means to detect deviations during a portion of a scan of the linear array.

3. A system according to claim 1 including:
means to actuate said means to initialize during the initial portion of each scan of the linear array.

4. A system according to claim 2 including:
means to actuate said means to inhibit during the initial portion of each scan of the linear array.

5. A system according to claim 2 including:
limit means to detect deviations in magnitude from a base signal of a plurality of photoelectric cell signals which exceed a predetermined limit;
and means to actuate said means to inhibit in response to said limit means.

6. A system according to claim 5 including:
means responsive to a photoelectric signal of a threshold value and said means to inhibit to actuate said means to initialize said means to detect deviations.

7. A system according to claim 5 wherein said predetermined limit is a predetermined count of photoelectric cell signals each having signal values which deviate from said base signal by at least a threshold amount issued by contiguous cells in the linear array of said line scan camera.

8. A system according to claim 7 including:
a memory for signal data derived from photoelectric cells to which said means to detect deviations respond;
and means to restrict data in said memory to that identifying the limits of the contiguous cells in the array of said line scan camera which have individual signals deviating a predetermined amount from the base signal of said means to detect deviations.

9. An electrooptical inspection system comprising:
a line scan camera having a linear array of photoelectric cells each responsive to the magnitude of light emanating from a discrete area of workpieces subject to inspection to generate a video signal as a series of pulses each of a magnitude which is a function of light intensity from a respective discrete area of the workpiece;
a low pass filter for the video signal from said camera;
means defining a threshold signal level for valid video signals; and
means responsive to a signal from said low pass filter which exceeds the signal from said threshold defining means to issue a signal indicative of valid video signal.

10. A system according to claim 9 comprising:
a logarithmic amplifier for the video signal from said camera to supply the video signal in amplified form to said low pass filter.

11. A system according to claim 9 comprising:
an analog to digital converter for the video signal from said low pass filter to supply a filtered digital signal to said means to issue a signal; and wherein said means defining a threshold signal level defines said signal in digital form.

12. A system according to claim 9 comprising:
a high pass filter for the video signal from said camera;
a series capacitance in said high pass filter;
a low resistance shunt to ground for the output side of said capacitance; and
means responsive to the signal from said means to issue a signal to increase the resistance to ground of the output side of said capacitance.

13. A system according to claim 12 comprising:
a logarithmic amplifier for the video signal from said camera to supply the video signal in amplified form to said low pass filter and said high pass filter.

14. A system according to claim 10 comprising:
a high pass filter for the video signal from said camera;
a series capacitance in said high pass filter;
a low resistance shunt to ground for the output side of said capacitance; and
means responsive to the signal from said means to issue a signal to increase the resistance to ground of the output side of said capacitance.

15. A system according to claim 9 comprising:
a latch responsive to said means to issue a signal; and
a reset for said latch effective following the conclusion of the series of pulses from the current scan of said camera linear array.

16. A system according to claim 15 comprising:
means for imparting relative movement between said camera and a workpiece subject to inspection;
means for scanning said linear array for each of a plurality of different relative positions of said camera and said workpiece; and
wherein said means to issue a signal is responsive during each of a plurality of scans of said linear array; and
said reset means for said latch is effective at the beginning of each scan in which said means to issue a signal is responsive.

17. The method of electrooptically inspecting workpieces comprising:
illuminating a workpiece over a field with light of uniform intensity;
exposing the field to a linear array of photoelectric cells each responsive to the magnitude of light incident thereon from discrete areas of the field;
scanning the array of photoelectric cells to generate a video signal as a series of pulses each of a magnitude which is a function of the incident light on its respective cell;
low pass filtering the video signal;
setting a threshold signal magnitude for validating an initial portion of the video signal; and
issuing a video signal validation signal in response to the filtered video signal exceeding the threshold signal.

18. The method according to claim 17 comprising the step of logarithmically amplifying the video signal prior to the low pass filtering step.

19. The method according to claim 17 comprising:
high pass filtering the video signal; and
inhibiting the high pass filtering of the video signal until a video signal validation signal is issued.

20. The method according to claim 17 comprising:
enabling the high pass filtering of the video signal for the balance of the scan of the array of photoelectric cells following the issuing of the video signal validation signal.

21. The method according to claim 17 comprising:
high pass filtering the video signal through a series capacitance;
grounding the output of the capacitance to rapidly charge the capacitance to the applied video signal level; and discontinuing the grounding in response to the video signal validation signal.

22. An electrooptical inspection system comprising:
a line scan camera having a linear array of photoelectric cells each responsive to the magnitude of light emanating from a discrete area of workpieces subject to inspection to generate a video signal as a series of pulses each of a magnitude which is a function of light intensity from a respective discrete area of the workpiece;
means to identify defects in workpieces subject to inspection by event signals resulting from deviations in the magnitude of pulses of the video signal from preceding video signal values to represent deviations in the light intensity from the workpiece from discrete areas containing defects from the average background light intensity from defect free areas;
data collection means for event signals;
identifying means for identifying as a string a series of contiguous event signals in a scan of said array;
counting means for counting event signals in a string identified by said identifying means; and
data compression means for compressing the data collected by said data collection means in response to a predetermined count of event signals by said counting means.

23. A system according to claim 22 comprising:
means responsive to the scan of the end of a string of event signals and operation of said data compression means by a signal count exceeding the predetermined count to collect data for the end of the string.

24. A system according to claim 22 comprising:
means responsive to the scan of the end of a string of event signals and operation of said data compression means by a signal count exceeding the predetermined count to reset said counting means.

25. A system according to claim 22 comprising:
means responsive to the scan of the end of a string of event signals and operation of said data compression means by a signal count exceeding the predetermined count to reset said data compression means.

26. A system according to claim 22 wherein said data compression means comprises:
means to suppress the collection of event signal data by said data collection means in response to a predetermined count of event signals by said counting means.

27. A system according to claim 22 wherein said data compression means comprises:
means to suppress the counting of event signals by said counting means in response to a predetermined count of event signals by said counting means.

28. A system according to claim 22 wherein said data collection means is a memory having storage addresses for data and comprising:
means to store the storage address in said memory for an event signal proximate the stored data for the first event signal of a string of event signals stored in said memory; and
means to store the data for the end of the string collected by said means to collect data at the storage address in said memory stored by said means to store the storage address.

29. A system according to claim 28 comprising:
means responsive to said data compression means to identify data stored in said memory for the end of the string as compressed data.

30. A system according to claim 22 wherein said string identifying means comprises:
an event signal input;
a clock signal source issuing a clock signal coincident with each event signal;
a first timing signal source issuing a signal during said clock signal;
a second timing signal source issuing a signal during said clock signal and subsequent to said first timing signal;
a first latch connected to said event signal input having an input from said second timing signal source to enable a change of state in response to coincident signals on said inputs and having an output;
a first coincidence gate having a first input directly connected to said event signal input and a second input directly connected to said first latch output;
an output for said gate;
a second latch having an input from said first timing signal source to enable a change of state in said latch in response to the signal on said input and having its input connected to said gate output; and
a second coincidence gate having a first input connected to the output of said second latch and a second input connected to said clock signal source whereby the second and subsequent event signals of a string of coincident event signals are passed by said second coincidence gate.

31. The method of electrooptically inspecting workpieces comprising:
illuminating a workpiece over a field with light of uniform intensity;
exposing the field to a linear array of photoelectric cells each responsive to the magnitude of light incident thereon from discrete areas of the field;
scanning the array of photoelectric cells to generate a video signal as a series of pulses each of a magnitude which is a function of the incident light on its respective cell;
sensing as event signals those pulses of a magnitude which deviate from a preset signal magnitude by greater than a predetermined amount;
identifying those event signals for contiguous pulses as an event signal string;
counting the event signal pulses in an event signal string;
storing data for each event signal; and
activating data compression of the stored data for a string in response to a predetermined count of the event signal pulses in a string.

32. The method according to claim 31 comprising:
identifying the end of an event signal; and
storing data of the first signal pulses and the end of the event signal string in response to activation of data compression.

33. The method according to claim 31 comprising:
identifying a given signal pulse subsequent to the initial pulse of a string and prior to the predetermined count; and
suppressing stored data for the identified given signal pulse and subsequent pulses in the string in response to activation of data compression.

34. The method according to claim 33 wherein the identified given signal pulse is the next pulse following the initial signal pulse of a string.

35. The method according to claim 33 comprising:
identifying the end of an event signal string; and
storing data for the end of the event signal string at the data storage location for the given signal pulse.

36. The method according to claim 31 comprising:
setting a data compression flag at a data storage location of the given signal pulse.

37. The method according to claim 31 comprising:
resetting the string identification and string pulse counting means in response to the termination of the string.

38. The method according to claim 31 comprising:
inhibiting the signal to the string identifying means at the beginning of a scan until the pulse magnitudes exceed a predetermined lower threshold magnitude.

* * * * *